United States Patent
Swanson et al.

(10) Patent No.: US 9,421,713 B2
(45) Date of Patent: Aug. 23, 2016

(54) ADDITIVE MANUFACTURING METHOD FOR PRINTING THREE-DIMENSIONAL PARTS WITH PURGE TOWERS

(71) Applicant: Stratasys, Inc., Eden Prairie, MN (US)

(72) Inventors: William J. Swanson, St. Paul, MN (US); Ronald G. Schloesser, New Brighton, MN (US); Gary Larson, Independence, MN (US)

(73) Assignee: Stratasys, Inc., Eden Prairie, MN (US)

( * ) Notice: Subject to any disclaimer, the term of this patent is extended or adjusted under 35 U.S.C. 154(b) by 530 days.

(21) Appl. No.: 13/790,924

(22) Filed: Mar. 8, 2013

(65) Prior Publication Data

US 2014/0252684 A1    Sep. 11, 2014

(51) Int. Cl.
B29C 67/00 (2006.01)

(52) U.S. Cl.
CPC ....... B29C 67/0055 (2013.01); B29C 67/0096 (2013.01)

(58) Field of Classification Search
CPC ................ B29C 67/0055; B29C 67/0096
USPC .................................. 264/308, 401
See application file for complete search history.

(56) References Cited

U.S. PATENT DOCUMENTS

| | | | |
|---|---|---|---|
| 5,121,329 A | 6/1992 | Crump | 364/468 |
| 5,169,081 A | 12/1992 | Goedderz | 242/54 |
| 5,303,141 A | 4/1994 | Batchelder et al. | 364/149 |
| 5,312,224 A | 5/1994 | Batchelder et al. | 415/73 |
| 5,340,433 A | 8/1994 | Crump | 156/578 |
| 5,503,785 A | 4/1996 | Crump et al. | 264/40.7 |
| 5,738,817 A | 4/1998 | Danforth et al. | 264/603 |
| 5,764,521 A | 6/1998 | Batchelder et al. | 364/475.01 |
| 5,866,058 A | 2/1999 | Batchelder et al. | 264/237 |
| 5,900,207 A | 5/1999 | Danforth et al. | 264/603 |
| 5,939,008 A | 8/1999 | Comb et al. | 264/308 |
| 5,968,561 A | 10/1999 | Batchelder et al. | 425/375 |
| 6,004,124 A | 12/1999 | Swanson et al. | 425/375 |
| 6,022,207 A | 2/2000 | Dahlin et al. | 425/145 |
| 6,054,077 A | 4/2000 | Comb et al. | 264/40.7 |
| 6,067,480 A | 5/2000 | Stuffle et al. | 700/109 |

(Continued)

FOREIGN PATENT DOCUMENTS

WO    2012070052 A1    5/2012
WO    2012085914 A1    6/2012

OTHER PUBLICATIONS

International Search Report and Written Opinion dated Jun. 25, 2014 for corresponding International Patent Application No. PCT/US2014/017915, filed Feb. 24, 2014.

*Primary Examiner* — Robert J Grun
(74) *Attorney, Agent, or Firm* — Westman, Champlin & Koehler, P.A.

(57) ABSTRACT

A method for printing a three-dimensional part with an additive manufacturing system, the method including printing layers of the three-dimensional part and of a support structure for the three-dimensional part from multiple print heads or deposition lines, and switching the print heads or deposition line between stand-by modes and operating modes in-between the printing of the layers of the three-dimensional part and the support structure. The method also includes performing a purge operation for each print head or deposition line switched to the operating mode, where the purge operation includes printing a layer of at least one purge tower from the print head or deposition line switched to the operating mode.

20 Claims, 7 Drawing Sheets

(56) References Cited

U.S. PATENT DOCUMENTS

| | | | |
|---|---|---|---|
| 6,070,107 A | 5/2000 | Lombardi et al. | 700/119 |
| 6,085,957 A | 7/2000 | Zinniel et al. | 226/8 |
| 6,129,872 A | 10/2000 | Jang | 264/75 |
| 6,228,923 B1 | 5/2001 | Lombardi et al. | 524/425 |
| 6,257,517 B1 | 7/2001 | Babish et al. | 242/365.6 |
| 6,547,995 B1 | 4/2003 | Comb | 264/40.1 |
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 | 9/2004 | Priedeman, Jr. et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,976,627 B1 | 12/2005 | Culp et al. | 235/462.01 |
| 6,998,087 B1 | 2/2006 | Hanson et al. | 264/308 |
| 7,122,246 B2 | 10/2006 | Comb et al. | 428/364 |
| 7,127,309 B2 | 10/2006 | Dunn et al. | 700/98 |
| 7,172,715 B2 | 2/2007 | Swanson et al. | 264/39 |
| 7,236,166 B2 | 6/2007 | Zinniel et al. | 345/419 |
| 7,261,533 B2 | 8/2007 | Wrosz et al. | 425/110 |
| 7,306,152 B2 | 12/2007 | Culp et al. | 235/462.01 |
| 7,384,255 B2 | 6/2008 | LaBossiere et al. | 425/190 |
| 7,481,647 B2 | 1/2009 | Sambu et al. | 425/436 |
| 7,572,121 B2 | 8/2009 | Wrosz et al. | 425/110 |
| 7,604,470 B2 | 10/2009 | LaBossiere et al. | 425/131.1 |
| 7,625,200 B2 | 12/2009 | Leavitt | 425/375 |
| 7,744,364 B2 | 6/2010 | Turley et al. | 425/225 |
| 7,896,209 B2 | 3/2011 | Batchelder et al. | 26/53 |
| 7,917,243 B2 | 3/2011 | Kozlak et al. | 700/119 |
| 7,938,351 B2 | 5/2011 | Taatjes et al. | 242/171 |
| 7,938,356 B2 | 5/2011 | Taatjes et al. | 242/580 |
| 8,033,811 B2 | 10/2011 | Swanson et al. | 425/375 |
| 8,070,473 B2 | 12/2011 | Kozlak | 425/375 |
| 8,075,300 B2 | 12/2011 | Zinniel | 425/445 |
| 8,153,182 B2 | 4/2012 | Comb et al. | 427/8 |
| 8,221,669 B2 | 7/2012 | Batchelder et al. | 264/308 |
| 8,226,395 B2 | 7/2012 | Pax et al. | 425/174.4 |
| 8,282,380 B2 | 10/2012 | Pax et al. | 425/375 |
| 8,287,794 B2 | 10/2012 | Pax et al. | 264/308 |
| 2005/0129941 A1 | 6/2005 | Comb et al. | 428/364 |
| 2007/0003656 A1 | 1/2007 | LaBossiere et al. | 425/375 |
| 2007/0228590 A1 | 10/2007 | LaBossiere et al. | 264/40.1 |
| 2009/0035405 A1 | 2/2009 | Leavitt | 425/97 |
| 2009/0173443 A1 | 7/2009 | Kozlak et al. | 156/303.1 |
| 2009/0263582 A1 | 10/2009 | Batchelder | 427/256 |
| 2009/0273122 A1 | 11/2009 | Batchelder et al. | 264/401 |
| 2009/0274540 A1 | 11/2009 | Batchelder et al. | 414/431 |
| 2010/0096072 A1 | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0283172 A1 | 11/2010 | Swanson | 264/80 |
| 2010/0327479 A1 | 12/2010 | Zinniel et al. | 264/172.14 |
| 2011/0074065 A1 | 3/2011 | Batchelder et al. | 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0186081 A1 | 8/2011 | Dunn et al. | 134/18 |
| 2011/0233804 A1 | 9/2011 | Batchelder et al. | 264/40.4 |
| 2011/0241947 A1 | 10/2011 | Scott et al. | 343/700 |
| 2012/0067501 A1 | 3/2012 | Lyons | 156/64 |
| 2012/0068378 A1 | 3/2012 | Swanson et al. | 264/308 |
| 2012/0070523 A1 | 3/2012 | Swanson et al. | 425/96 |
| 2012/0162314 A1 | 6/2012 | Swanson et al. | 347/37 |
| 2012/0164256 A1 | 6/2012 | Swanson et al. | 425/162 |
| 2012/0258250 A1 | 10/2012 | Rodgers | |
| 2012/0304449 A1 | 12/2012 | Jackson et al. | |
| 2013/0075957 A1 | 3/2013 | Swanson et al. | 264/405 |
| 2013/0078073 A1 | 3/2013 | Comb et al. | 414/749.1 |
| 2015/0093588 A1* | 4/2015 | Sadusk | B29C 67/0092 428/480 |

\* cited by examiner

ADDITIVE MANUFACTURING METHOD FOR PRINTING THREE-DIMENSIONAL PARTS WITH PURGE TOWERS

BACKGROUND

The present disclosure relates to additive manufacturing systems for printing or otherwise building three-dimensional (3D) parts with layer-based, additive manufacturing techniques. In particular, the present disclosure relates to purge operation techniques for use in extrusion-based additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for printing a 3D part with an additive manufacturing system. The method includes printing layers of the 3D part and of a support structure for the 3D part from multiple print heads or deposition lines using a layer-based, additive manufacturing technique, and switching the print heads or deposition line between stand-by modes and operating modes in-between the printing of the layers of the 3D part and the support structure. The method also includes performing a purge operation for each print head or deposition line switched to the operating mode, where the purge operation includes printing a layer of at least one purge tower from the print head or deposition line switched to the operating mode.

Another aspect of the present disclosure is directed to a method for printing a 3D part with an additive manufacturing system, which includes bringing a first print head or deposition line from a stand-by mode to an operating mode, printing a first layer of a purge tower from a support material using the first print head or deposition line in the operating mode, and printing a layer of a support structure from the support material using the first print head in the operating mode after printing the first layer of the purge tower. The method also includes bringing a second print head or deposition line from a stand-by mode to an operating mode, printing a second layer of the purge tower from a part material using the second print head or deposition line in the operating mode, and printing a layer of the 3D part from the part material using the second print head in the operating mode after printing the second layer of the purge tower.

Another aspect of the present disclosure is directed to a method for printing a 3D part with an additive manufacturing system, which includes printing a first layer of a support structure for the 3D part, printing a first layer of a purge tower from a part material, and printing a first layer of the 3D part on at least a portion of the first layer of the support structure from the part material after printing the first layer of the purge tower. The method also includes printing a second layer of the purge tower from the support material, and printing a second layer of the support structure on at least a portion of the first layer of the 3D part from the support structure after printing the second layer of the purge tower.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

Figure 1:
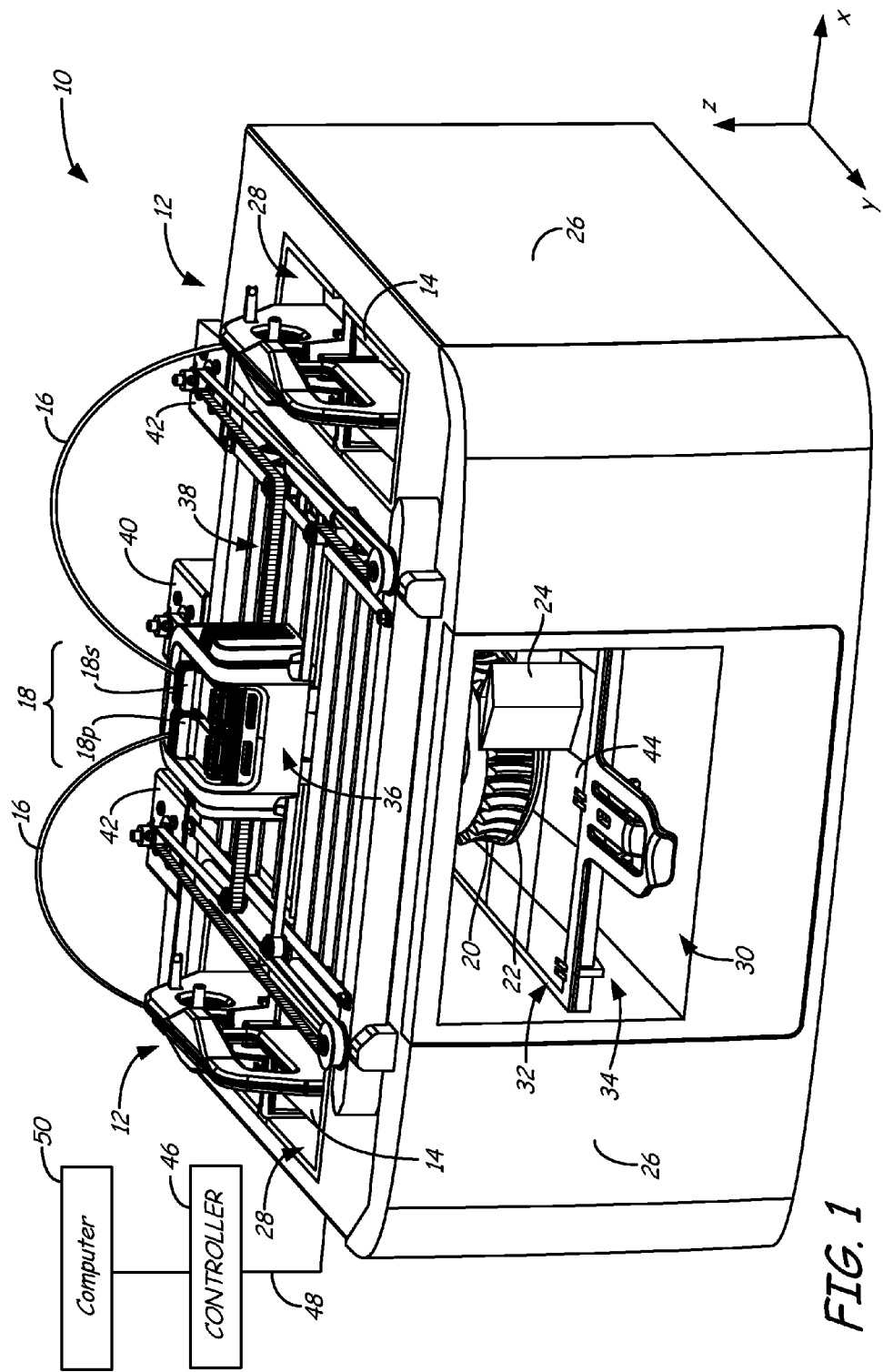
FIG. 1 is a top, front perspective view of an additive manufacturing system in use with consumable assemblies for printing 3D parts, support structures, and a purge tower of the present disclosure.

The present disclosure is directed to a method for printing 3D parts and support structures using an additive manufacturing system with the use of a purge tower (or multiple purge towers). As briefly mentioned above, in fabricating 3D parts by depositing layers of a part material, one or more support structures may be built underneath overhanging portions or in cavities of 3D parts under construction, which are not supported by the part material itself. The support structures are preferably printed from a support material that is removable from the associated 3D part after the printing operation is completed.

To accomplish this, the additive manufacturing system may utilize multiple print heads or deposition lines, where a first print head or deposition line may be used to print the 3D part, and a second material print head or deposition line may be used to print the support structure. For ease of discussion, the following disclosure is made with reference to separate print heads for printing 3D parts and support structures, referred to as a "part print head" and a "support print head". Examples of such part and support print heads include those disclosed in Swanson et al., U.S. Publication Nos. 2010/0283172 and 2012/0164256. However, the method of the present disclosure is equally applicable for use with a single deposition head having multiple deposition lines for printing 3D parts and support structures. Examples of such deposition heads include those disclosed in Leavitt, U.S. Pat. No. 7,625,200, and LaBossiere et al., U.S. Pat. No. 7,604,470.

When printing with multiple print heads (or multiple deposition lines), each print head or deposition line is preferably switchable between an "operating mode" and a "stand-by mode". The operating mode is preferably a mode in which a liquefier assembly of the print head to be heated to its set point operating temperature(s) to generate a desired thermal gradient for melting the part or support material. In comparison, the stand-by mode is preferably a mode in which the liquefier assembly of the print head is cooled down from its operating mode to prevent its part or support material from thermally degrading, oozing or dripping out.

Additionally, in some embodiments, when switching between the operating mode and the stand-by mode, one or more of the print heads are may be lifted, pivoted, or otherwise moved relative to the build plane and/or each other, such as also disclosed in Leavitt, U.S. Pat. No. 7,625,200, LaBossiere et al., U.S. Pat. No. 7,604,470, and Swanson et al., U.S. Publication Nos. 2010/0283172 and 2012/0164256. For example, when switching from the operating mode to the stand-by mode, a print head may be lifted, pivoted, or otherwise moved away from the build plane by a small distance to prevent interference with the printed layers. Then, when subsequently switched back to its operating mode, the print head moved back to its original distance relative to the build plane for printing a subsequent layer.

Typically, when the part print head is in its operating mode to print a layer of the 3D part, the support print head is its stand-by mode, and vice versa. For example, after a 3D part layer is completed, the additive manufacturing system may then switch the print heads such that the support print head is brought to its operating mode to print a layer of the support structure, and the part print head is brought to its stand-by mode. Then, after the support structure layer is completed, the additive manufacturing system may switch the print heads back such that the part print head is brought to its operating mode to print a layer of the support structure, and the part print head is brought to its stand-by mode.

When each print head is brought to its operating mode, it preferably undergoes a purge operation prior to printing the next layer. As discussed in Turley et al., U.S. Pat. No. 7,744,364, a purge operation conventionally involves moving the given print head to a purge station, where it extrudes a strand of the part or support material into a purge bucket, optionally followed by a tip wipe operation.

This purge operation provides several desired functions. First, it frees any part or support material filament that may be adhered to the walls of the liquefier assembly, and verifies that the print head can extrude the part or support material. It also removes any entrained gases and degraded materials in the print head, and brings the print head to a known operating state for printing the subsequent layer, such as bringing a meniscus in the liquefier assembly to a substantially known position and raising the internal temperature of the liquefier assembly to a substantially steady-state condition. It also removes variable ooze that may hang from a nozzle of the liquefier assembly while the print head is idle or in its stand-by mode, and can account for variability of any voids in a tip pipe region of the nozzle. Additionally, for very low-volume-per-layer 3D parts, it may provide a minimum flow volume per layer to reduce the residence time-at-temperature for the part material.

However, the use of a purge station typically requires a sufficient amount of the part or support material to be extruded from the print head to have enough weight to fall away from the given print head and into a purge bucket. Furthermore, the purge station itself can take up a sizeable footprint in the additive manufacturing system, which may reduce the usable build volume for printing 3D parts. Moreover, the purge buckets periodically need to be emptied of the accumulate purged strands. This can inhibit the additive manufacturing system from functioning in a fully automated manner, such as in a printer farm.

As such, the method of the present disclosure is directed to a process in which the part and support print heads print a purge tower (or multiple purge towers) during the purge operations. As discussed below, the purge tower allows each print head to achieve the above-discussed desired functions of a purge operation without requiring the use of a separate purge station. This can increase the useable build volume in the additive manufacturing system, as well as reducing the amount of part and support materials consumed during the purge operations and allowing the additive manufacturing system to operate in a fully automated manner.

FIG. 1 shows system 10 in use with two consumable assemblies 12, which illustrates a suitable additive manufacturing system for performing the method of the present disclosure to print 3D parts and support structures along with one or more purge towers. Each consumable assembly 12 is an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portion 14, guide tube 16, print heads 18, where print heads 18 are individually referred to as part print head 18$p$ (for the part material) and support print head 18$s$ (for the support material). Container portion 14 may retain a spool or coil of a consumable filament, such as discussed in Mannella et al., U.S. patent application Ser. Nos. 13/334,910 and 13/334,921. Guide tube 16 interconnects container portion 14 and print head 18, where a drive mechanism of print head 18 (or of system 10) draws successive segments of the consumable filament from container portion 14, through guide tube 16, to a liquefier assembly of the print head 18.

In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

Suitable part and support materials for consumable assemblies 12 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495.

System 10 is an additive manufacturing system for printing 3D parts or models and corresponding support structures (e.g., 3D part 20 and support structure 22) from the part and support material filaments, respectively, of consumable assemblies 12, using a layer-based, additive manufacturing technique. Additionally, as described further below, system 10 may also print purge tower 24 from the part and support materials during purge operations.

Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosed environment that contains platen 32 for printing 3D part 20 and support structure 22. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 20 and support structure 22 may be built in a build environment that is open to ambient conditions or may be enclosed with alternative structures (e.g., flexible curtains).

Platen 32 is a platform on which 3D part 20, support structure 22, and purge tower 24 are printed in a layer-by-layer manner, and is supported by platen gantry 34. In some embodiments, platen 32 may engage and support a build substrate 44, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 32 or onto the build substrate 44. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. Publication Nos. 2010/0283172 and 2012/0164256.

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18 and head gantry 38 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

In the shown embodiment, head gantry 38 is a belt-driven gantry assembly configured to move head carriage 36 (and the retained print heads 18) in (or substantially in) a horizontal x-y plane above chamber 30, and is powered by x-y motors 42. Examples of suitable gantry assemblies for head gantry 38 include those disclosed in Comb et al., U.S. patent Ser. No. 13/242,561.

In an alternative embodiment, platen 32 may be configured to move in the horizontal x-y plane within chamber 30, and head carriage 36 (and print heads 18) may be configured to move along the z-axis. Other similar arrangements may also be used such that one or both of platen 32 and print heads 18 are moveable relative to each other. Platen 32 and head carriage 36 (and print heads 18) may also be oriented along different axes. For example, platen 32 may be oriented vertically and print heads 18 may print 3D part 20 and support structure 22 along the x-axis or the y-axis.

System 10 may also include a pair of sensor assemblies (not shown) configured to read encoded markings from successive segments of the consumable filaments moving through guide tubes 16, such as disclosed in Batchelder et al., U.S. Patent Application Publication Nos. 2011/0117268, 2011/0121476, and 2011/0233804.

System 10 also includes controller 46, which is one or more control circuits configured to monitor and operate the components of system 10. For example, one or more of the control functions performed by controller 46 can be implemented in hardware, software, firmware, and the like, or a combination thereof. Controller 46 may communicate over communication line 48 with print heads 18, chamber 30 (e.g., with a heating unit for chamber 30), head carriage 36, motors 40 and 42, sensor assemblies 44, and various sensors, calibration devices, display devices, and/or user input devices. In some embodiments, controller 46 may also communicate with one or more of bays 28, platen 32, platen gantry 34, head gantry 38, and any other suitable component of system 10.

While illustrated as a single signal line, communication line 48 may include one or more electrical, optical, and/or wireless signal lines, allowing controller 46 to communicate with various components of system 10. Furthermore, while illustrated outside of system 10, controller 46 and communication line 48 may be internal components to system 10. System 10 and/or controller 46 may also communicate with one or more computer-based systems, such as computer 50, which may include computer-based hardware, such as data storage devices, processors, memory modules and the like for generating, storing, and transmitting tool path and related printing instructions to system 10, and may be external and/or internal to system 10. In some embodiments, controller 46 itself may perform one or more of the operations typically performed by computer 50 or other components of system 10, such as generating and storing tool path and related printing instructions, perform compiler functions, and the like.

During operation, controller 46 may direct z-axis motor 40 and platen gantry 34 to move platen 32 to a predetermined height within chamber 30. Controller 46 may then direct motors 42 and head gantry 38 to move head carriage 36 (and the retained print heads 18) around in the horizontal x-y plane above chamber 30. Controller 46 may also direct print heads 18 to selectively draw successive segments of the consumable filaments from container portions 14 and through guide tubes 16, respectively.

Figures 2A, 2B:
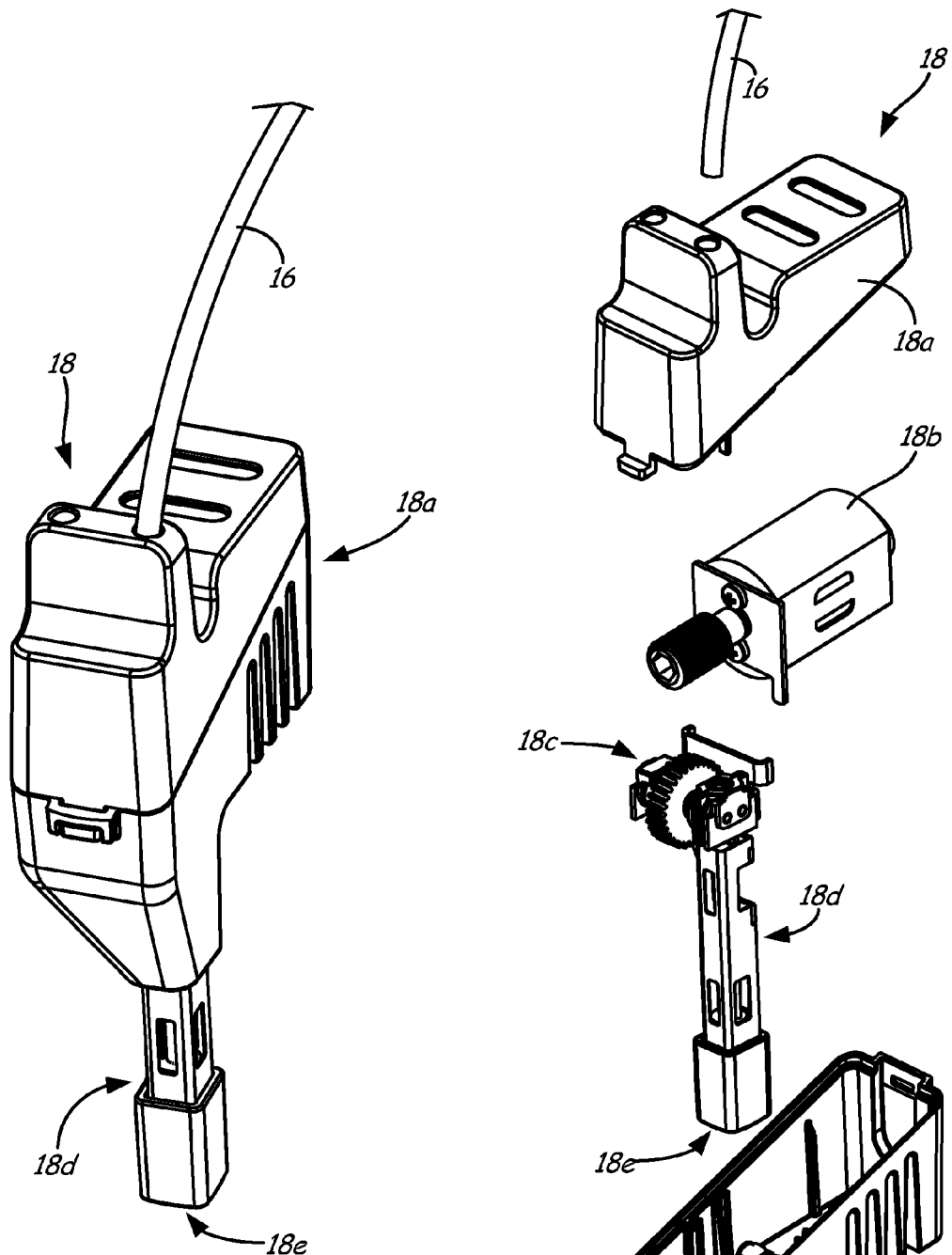
FIG. 2A is a perspective view of a print head and guide tube for use with the additive manufacturing system.
FIG. 2B is an exploded perspective view of the print head.

FIGS. 2A and 2B illustrate an example print head 18, which includes housing 18a, motor assembly 18b, drive mechanism 18c, and liquefier assembly 18d, where liquefier assembly 18d includes nozzle 18e. At each print head 18, motor assembly 18b and drive mechanism 18c feed successive segments of the consumable filament to liquefier assembly 18d, which thermally melts the received successive segments such that the consumable filament becomes a molten material. The molten material is then extruded from nozzle 18e and deposited onto platen 32 for printing 3D part 20, support structure 22, and purge tower 24 in a layer-by-layer manner.

As discussed in Swanson et al., U.S. patent application Ser. No. 13/587,002, nozzle 18e may have an axial channel any suitable length-to-diameter ratio. For example, in some embodiments, nozzle 18e may have an axial channel with a length-to-diameter ratio to generate high flow resistance, such as a ratio of about 2:1 to about 5:1. In other embodiments, nozzle 18e may have an axial channel with a length-to-diameter ratio to generate lower flow resistance, such as a ratio less than about 1:1. Accordingly, suitable length-to-diameter ratios for the axial channel of nozzle 18e may range from about 1:2 to about 5:1, where in some low-flow resistance embodiments, ratios ranging from about 1:2 to about 1:1 may be preferred for use with the method of the present disclosure.

After the print operation is complete, the resulting 3D part 32 and support structure 22 may be removed from chamber 30, and support structure 22 may be removed from 3D part 20. Purge tower 24 itself may be then recycled or otherwise discarded as desired. 3D part 20 may then undergo one or more additional post-processing steps.

Figure 3A:
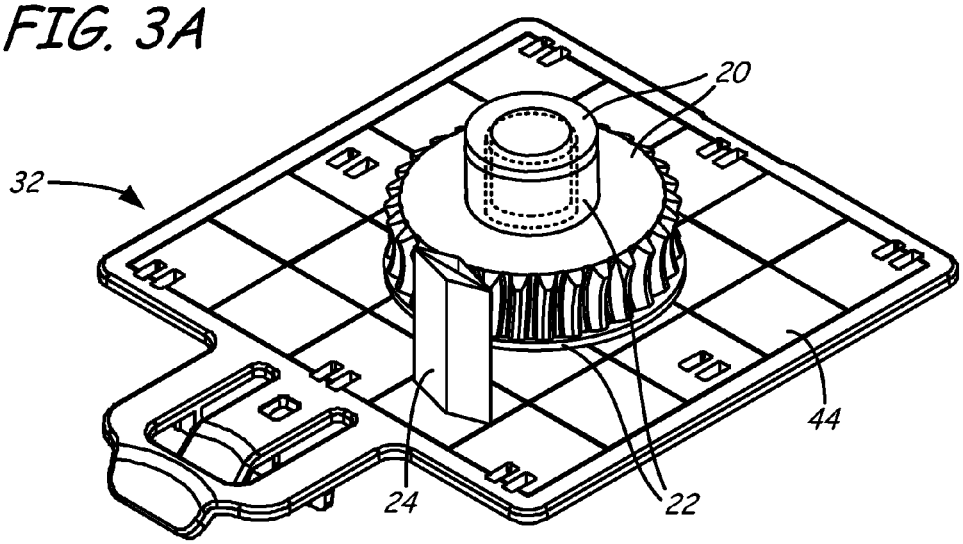
FIG. 3A is a perspective view of a printed 3D part, support structure, and purge tower on a build substrate.
Figure 3B:
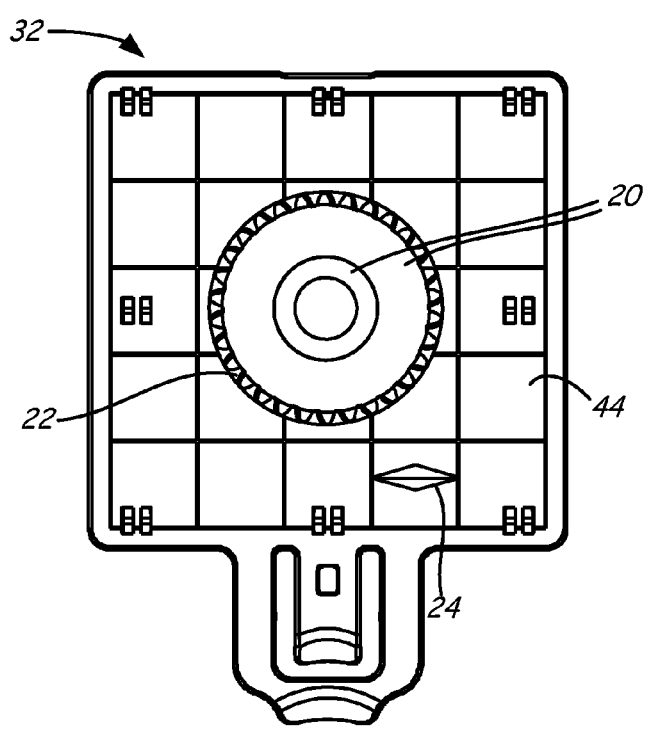
FIG. 3B is a top view of the printed 3D part, support structure, and purge tower on the build substrate.

As shown in FIG. 1, and further shown in FIGS. 3A and 3B, purge tower 24 may be printed at any suitable free location on build substrate 44 (i.e., at any location in the x-y build plane not occupied by 3D part 20 or support structure 22). As discussed further below, each layer of purge tower 24 is printed by either the part material or by the support material depending on when print heads 18 switch between their operating modes and their stand-by modes and perform the purge operations.

Figure 4:
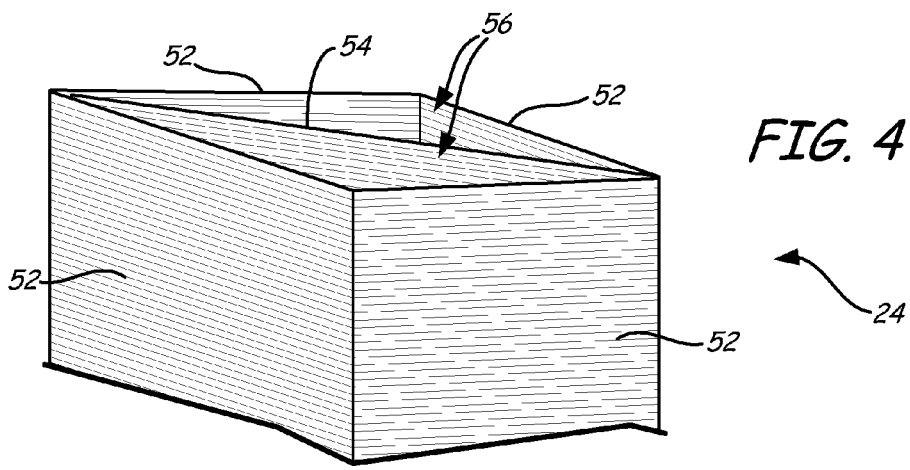
FIG. 4 is a perspective view of a top portion of the purge tower.

As further shown in FIG. 4, purge tower 24 is printed in a layer-by-layer manner to define perimeter wall 52 and interior wall 54, where perimeter wall 52 has a diamond-shaped cross-sectional geometry in the x-y build plane that defines interior volume 56. Interior wall 54 resides inside interior volume 56, and, in the shown embodiment, bisects or substantially bisects interior volume 56. This is a particularly suitable geometry for printing purge tower 24 at fast print rates and with low amounts of materials since, for each layer, perimeter wall 52 and interior start wall 54 may be printed from a single tool path. This accordingly reduces delays and material consumption during the purge operations. However, in other embodiments, one or more of the layers of purge tower 24 may be printed with two or more tool paths.

In alternative embodiments, purge tower 24 may have any suitable perimeter wall geometry that preferably defines an interior volume that is substantially enclosed in the x-y build plane for retaining an interior wall 52. Examples of suitable perimeter wall geometries include square walls, rectangular walls, circular walls, elliptical walls, and the like, where single-tool path, simple geometries are preferred for fast print rate purposes.

Figure 5:
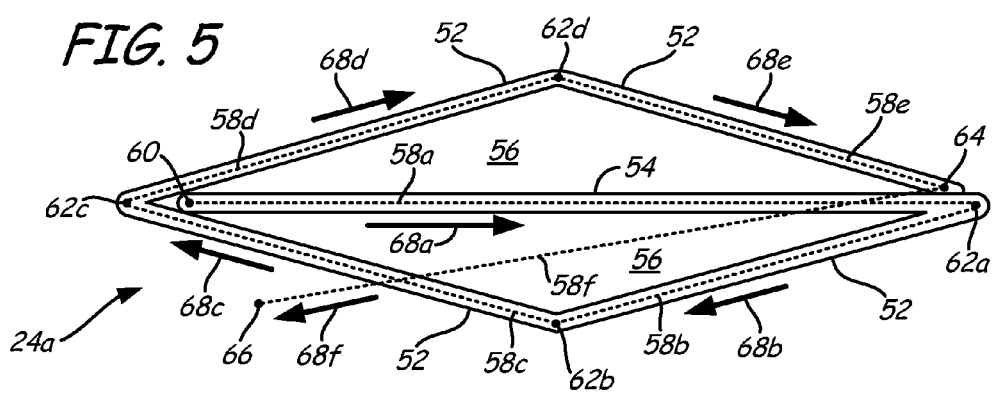
FIG. 5 is a top view of a layer of the purge tower, illustrating a process for printing the layer.

As shown in FIG. 5, each layer of purge tower 24 (referred to as layer 24a) is preferably printed along the same tool path 58, which has a start vertex 60, corner vertices 62a-62d, and stop vertex 64, and tool path segments 58a-58a extending therebetween. As mentioned above, controller 46 may direct one of print heads 18 to perform a purge operation by printing a layer 24a of purge tower 24 after the given print head 18 switches from its stand-by mode to its operating mode, and prior to printing a subsequent layer of 3D part 20 or support structure 22.

When performing the purge operation, controller 46 may direct head gantry 36 to move the print head 18 over to start vertex 60. Controller 46 may then direct a drive mechanism of the print head 18 to feed the part or support material filament to the print head 18 to extrude the part or support material. Controller 46 may also direct head gantry 36 to move the print head 18 along tool path segments 58a-58e in the direction of arrows 68a-68e. Upon reaching stop vertex 64, controller 46 may direct the print head 18 to stop extruding the part or support material to complete layer 24a.

This tool path pattern is beneficial for containing any excess stringing at the extrusion start up to a region within interior volume 56. In other words, perimeter wall 52 prevents any stringing that may occur from exiting purge tower 24, which could otherwise potentially interfere with the printing of 3D part 20 or support structure 22 due to the close proximity of purge tower 24 and 3D part 20 (compared to the offset locations of conventional purge stations).

The length of tool path segment 58a between start vertex 60 and the first corner vertex 62a may vary depending on the stringing conditions of the print head 18, which may be based on multiple factors, such as the thermal properties of the print head 18, the composition of the part or support material, the extrusion rate and movement rate of print head 18, the temperature within chamber 30, the amount of degraded materials and gases accumulated in the print head 18 during its stand-by mode, and the like. The lengths of tool path segments 58b-58e may accordingly be based on the length of tool path segment 58a.

Furthermore, while illustrated as extending entirely across interior volume 56, tool path segment 58a may alternatively be shorter, such that start vertex may be positioned at any suitable location relative to the first corner vertex 62a to contain the excess stringing to a region within interior volume 56. Overall, the entire length of tool path 58 is preferably sufficient such that the print head 18 attains a known operating state for printing the subsequent layer of 3D part 20 or support structure 22, and more preferably such that print head 18 achieves all of the above-discussed desired functions of a purge operation (without requiring the use of a separate purge station).

Optionally, as shown, stop vertex 64 may alternatively function as another corner vertex, and tool path 58 may be directed across the top of layer 24a, such as illustrated by tool path segment 58f to a subsequent stop vertex 66 located outside of purge tower 24. However, when following tool path segment 58f, controller 46 preferably directs the print head 18 not to extrude any material. Instead, the movement of the print head along tool path segment 58f (or any other similar tool path segment) allows nozzle 18e of the print head 18 to wipe along perimeter wall 52 at tool path segment 58c. As such, purge tower 24 may also function as a tip wipe device, which further precludes the need for a separate purge station.

As mentioned above, each layer 24a of purge tower 24 is preferably printed along the same tool path 58. However, in situations in which purge tower 24 will be printed high enough that its height is substantially greater than its cross-sectional area, it can be beneficial to print the lower layers 24a of purge tower 24 with larger cross-sectional areas, with walls that slope or taper to small cross-sectional areas at the higher layers. This preferably prevents to the portion of purge tower 24 from wobbling during the printing operation, which can otherwise impair the printing of subsequent layers.

Computer 50 (or controller 46) may generate tool path instructions for printing purge tower 24 at any suitable time before and/or during the printing operation. In a first embodiment, purge tower 24 may be generated when slicing and generating supports for 3D part 20. For example, upon receipt of a digital model for 3D part 20, computer 50 may run a pre-processing program to slice 3D part 20 into the separate layers, generate support structure 22, and generate tool paths for 3D part 20 and support structure 22. Examples of suitable pre-processing programs includes those developed by Stratasys, Inc., Eden Prairie, Minn. under the trademarks "INSIGHT" and "CATALYST", which may be modified to generate the tool paths (e.g., tool path 58) for each layer of purge tower 24.

In a second embodiment, the tool paths for purge tower 24 may be post-processed into the previously-generated tool path instructions with a separate post-processing program (after running the pre-processing program). This post-processing program may operated manually by a user, or may be invoked in an automated manner by the pre-processing program and/or controller 46.

In a third embodiment, the tool paths for purge tower 24 may be compiled by computer 50 during the printing operation. In this embodiment, when system 10 is printing a given layer, computer 50 may look ahead at the generated tool path instructions and identify when the next material switch will occur. At this point, computer 50 may compile and insert a tool path (e.g., tool path 58) for purge tower 24 in the timing sequence to occur after the next print head 18 switch. Preferably, computer 50 may also compute the amount of part or support material required to print the given layer of purge tower 24 to ensure that consumable assemblies 12 still have enough supplies of the part or support materials to complete the printing operation.

Figure 6:
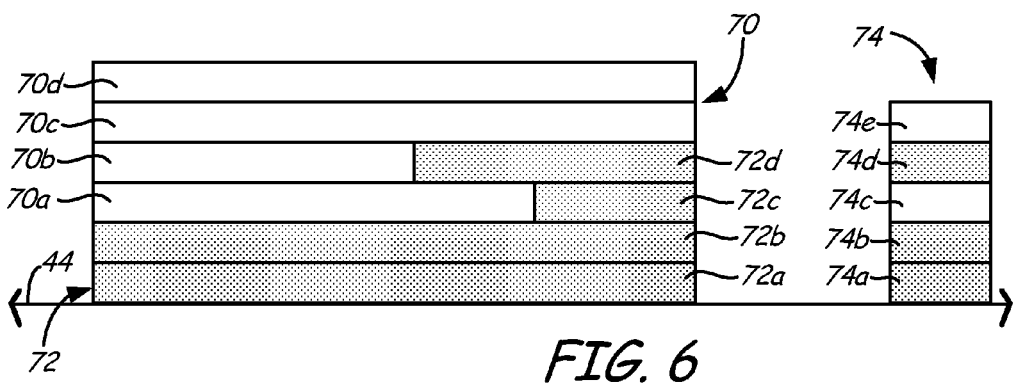
FIG. 6 is a side view of simplified layers of a printed 3D part, support structure, and purge tower on a build substrate.

The particular material used for each layer 24a depends on which print head 18 will be switched from its stand-by mode to its operating mode for the given layer of 3D part 20 and support structure 22. This timing typically depends on when the tool paths for the layers of 3D part 20 and support structure 22 require material switching. For instance, FIG. 6 illustrates a simplified layer arrangement for a 3D part 70 and support structure 72 that may be printed with system 10, where 3D part 70 is printed from part print head 18p with part layers 70a-770d, and support structure 72 is printed from support print head 18s with support layers 72a-72d (shown with speckle fill). In this example, print heads 18 may also print purge tower 74 from the part and support materials during the purge operations.

As shown, the first two printed layers 72a and 72b are for support structure 72. As such, prior to printing support layer 72a on build substrate 44, support print head 18s may be brought to its operating mode and undergo a purge operation by printing layer 74a of purge tower 74 from the support material, preferably following the same tool path 58 discussed above for purge tower 24 (shown in FIG. 5). Support print head 18s may then print support layer 72a from the support material following designated tool paths. When support layer 72a is completed, platen gantry 34 may lower platen 32 and build substrate 44 downward along the z-axis by a single layer increment.

Then, because support layer 72b is also printed entirely from the support material, support print head 18s may print support layer 72b following designated tool paths, and then print layer 74b of purge tower 74 from the support material.

Alternatively, if desired, the tool path configuration may be arranged such that support print head 18*s* prints layer 74*b* prior to printing support layer 72*b*. Support layer 72*b* is necessary for maintaining purge tower 74 at the same height as the printed layers of 3D part 70 and support structure 72.

When layers 72*b* and 74*b* are completed, platen gantry 34 may then lower platen 32 and build substrate 44 downward along the z-axis by a single layer increment. As can be seen, layers 70*a* and 72*c* are coplanar with each other. As such, because support print head 18*s* is the current print head 18 in its operating mode (part print head 18*p* is currently in its stand-by mode), support layer 72*c* may be printed prior to part layer 70*a*. Accordingly, support print head 18*s* may print support layer 72*c* from the support material following designated tool paths.

Then, print heads 18 may be switched such that support print head 18*s* is brought to its stand-by mode and part print head 18*p* is brought to its operating mode. Part print head 18*p* may then undergo a purge operation by printing layer 74*c* of purge tower 74 from the part material, preferably following the same tool path 58 discussed above for purge tower 24. Part print head 18*p* may then print part layer 70*a* from the part material following designated tool paths. When part layer 70*a* is completed, platen gantry 34 may lower platen 32 and build substrate 44 downward along the z-axis by a single layer increment.

The next layers 70*b* and 72*d* are also coplanar with each other. As such, because part print head 18*p* is the current print head 18 in its operating mode (support print head 18*s* is currently in its stand-by mode), part layer 70*b* may be printed prior to support layer 72*d*. Accordingly, part print head 18*p* may print part layer 70*b* from the part material following designated tool paths.

Then, print heads 18 may be switched back such that part print head 18*p* is brought to its stand-by mode and support print head 18*s* is brought to its operating mode. Support print head 18*s* may then undergo a purge operation by printing layer 74*d* of purge tower 74 from the support material. Support print head 18*s* may then print support layer 72*d* from the support material following designated tool paths. When support layer 72*d* is completed, platen gantry 34 may lower platen 32 and build substrate 44 downward along the z-axis by a single layer increment.

Then, because support layer 70*c* is printed entirely from the part material, and because support print head 18*s* is the current print head 18 in its operating mode, print heads 18 may be switched such that support print head 18*s* is brought to its stand-by mode and part print head 18*p* is brought to its operating mode. Part print head 18*p* may then undergo a purge operation by printing layer 74*e* of purge tower 74 from the part material. Part print head 18*p* may then print part layer 70*c* from the part material following designated tool paths. When part layer 70*a* is completed, platen gantry 34 may lower platen 32 and build substrate 44 downward along the z-axis by a single layer increment.

Then, because part layer 70*d* is also printed entirely from the part material, and because part print head 18*p* is the current print head 18 in its operating mode, print head 18*p* may print part layer 70*d* following designated tool paths. At this point, because there are no further layers of support structure 72, there will be no further switching between operating and stand-by modes for print heads 18. In particular, purge tower 70 can be stopped at the highest layer at which there is a material change (i.e., a switch from part to support material, or vice versa) Accordingly, additional layers for purge tower 24 are no longer necessary, and may be omitted. On the other hand, if additional support layers for support structure 72 are to be subsequently printed, additional layers of purge tower may be printed from the part material with each layer of 3D part 70 until the next print head switching and purge operation is required.

Figure 7:
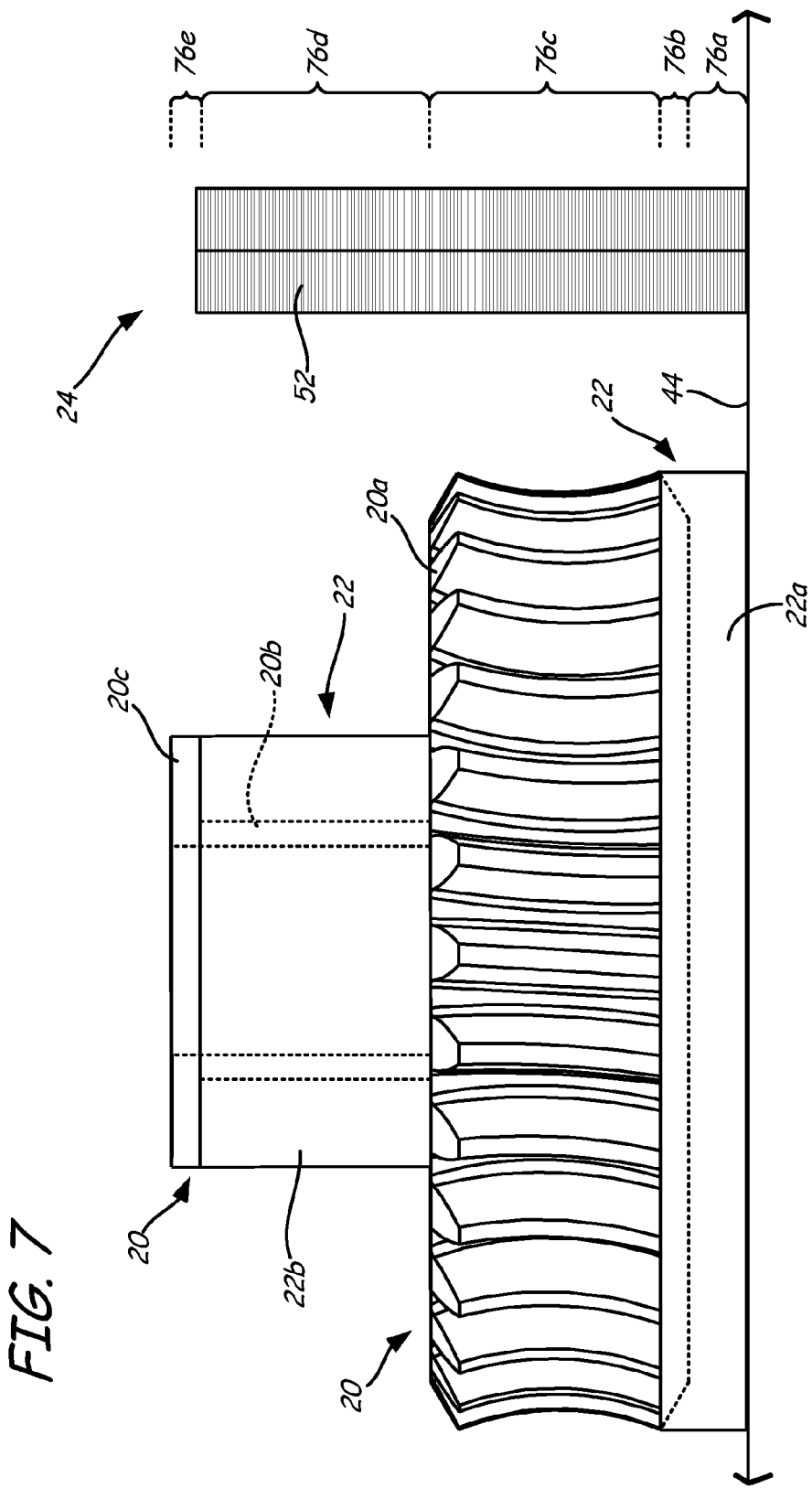
FIG. 7 is a side view of the printed 3D part, support structure, and purge tower on the build substrate.

FIG. 7 illustrates a suitable example for printing 3D part 20, support structure 22, and purge tower 24 in the same manner, where 3D part 20 has a base portion 20*a*, a shaft portion 20*b*, and an overhanging top portion 20*c*. Similarly, support structure 22 has an anchor portion 22*a* that supports and anchors base portion 20*a* to build substrate 44, and an upper portion 22*b* that supports overhanging top portion 20*c* and encapsulates shaft portion 20*b*.

As further shown, the layers of 3D part 20 and support structure 22 may be grouped into stack regions 76*a*-76*e*. At stack region 76*a*, the layers only include the support material for anchor portion 22*a*. Above that, at stack region 76*b*, each layer includes the part material for base portion 20*a* and the support material for anchor portion 22*a*. Then, at stack region 76*c*, the layers only include the part material for base portion 20*a*. Above that, at stack region 76*d*, each layer includes the part material for shaft portion 20*b* and the support material for upper portion 22*b*. Finally, at stack region 76*e*, the layers only include the part material for overhanging top portion 20*c*.

As discussed above for purge tower 74 (show in FIG. 6), the layers of purge tower 24 may also stagger and interlace between the part and support materials in patterns that are based on the layer patterns of stack regions 76*a*-76*e*. For example, prior to printing the layers for anchor portion 22*a* of support structure 22, support print head 18*s* may switch to its operating mode and perform a purge operation by printing a first layer of purge tower 24 onto build substrate 44 from the support material. Support print head 18*s* may then print the first layer of anchor portion 22*a* onto build substrate 44 from the support material.

The printing of purge tower 24 and anchor portion 22*a* may then be repeated for each layer in stack region 76*a*, where platen gantry 32 may incrementally lower platen 30 and platen substrate 44 downward by a single layer increment between each printed layer. As such, the layers of purge tower 24 at stack region 76*a* may be printed entirely from the support material, and purge tower 24 preferably has the same height as the printed layers of anchor portion 22*a*.

After the last layer in stack region 76*a* is completed, and platen gantry 32 lowers platen 30 and platen substrate 44 downward by a single layer increment, the situation changes because the next layer increment (i.e., the first layer in stack region 76*b*) includes a layer of base portion 20*a* (i.e., part material) and a layer of anchor portion 22*a* (i.e., support material). As such, because support print head 18*s* is the current print head 18 in its operating mode, support print head 18*s* may print the layer of anchor portion 22*a* from the support material. Print heads 18 may then be switched such that support print head 18*s* is brought to its stand-by mode and part print head 18*p* is brought to its operating mode. Part print head 18*p* may then undergo a purge operation by printing the next layer of purge tower 24 from the part material, and then print the layer for base portion 20*a*.

After the current layer is completed, platen gantry 32 may lower platen 30 and platen substrate 44 downward by a single layer increment, and part print head 18*p* may print the next layer of base portion 20*a* from the part material. Print heads 18 may then be switched such that part print head 18*p* is brought to its stand-by mode and support print head 18*s* is brought to its operating mode. Support print head 18*s* may then undergo a purge operation by printing the next layer of purge tower 24 from the support material, and then print the layer for anchor portion 22a.

This back-and-forth switching may then be repeated for each layer in stack region 76b following the same pattern as discussed above for part layers 70a and 70b, support layers 72c and 72d (shown in FIG. 6), and purge tower layers 74c and 74d. As such, for stack region 76b, the layers of purge tower 24 have an interlaced pattern that switches back and forth between the part material and the support material on a layer-by-layer basis.

After the last layer in stack region 76b is completed, and platen gantry 32 lowers platen 30 and platen substrate 44 downward by a single layer increment, the situation changes again because the next layer (i.e., the first layer in stack region 76c) includes only the part material for base portion 20a. As such, if support print head 18s is currently the print head 18 in its operating mode, print heads 18 may be switched such that support print head 18s is brought to its stand-by mode and part print head 18p is brought to its operating mode. Part print head 18p undergo a purge operation by printing the next layer of purge tower 24 from the part material.

Alternatively, if part print head 18p is currently the print head 18 in its operating mode, it may remain in its operating mode, and print the next layer of purge tower 24 from the part material to maintain the height of purge tower 24. Part print head 18p may then print each successive layer of base portion 20a and purge tower 24 in stack region 76c from the part material, where platen gantry 32 may incrementally lower platen 30 and platen substrate 44 downward by a single layer increment between each printed layer. As such, the layers of purge tower 24 at stack region 76c may be printed entirely from the part material, and purge tower 24 preferably has the same height as the printed layers of base portion 20a.

After the last layer in stack region 76c is completed, and platen gantry 32 lowers platen 30 and platen substrate 44 downward by a single layer increment, the situation changes again because the next layer (i.e., the first layer in stack region 76d) includes a layer of shaft portion 20b (i.e., part material) and a layer of upper portion 22b (i.e., support material). As such, because part print head 18p is the current print head 18 in its operating mode at this point, part print head 18p may print the first layer of shaft portion 22b from the part material.

Print heads 18 may then be switched such that part print head 18p is brought to its stand-by mode and support print head 18s is brought to its operating mode. Support print head 18s may then undergo a purge operation by printing the next layer of purge tower 24 from the support material, and then print the first layer for upper portion 22b. The same back-and-forth switching as discussed above for stack region 76b may then be repeated for each layer in stack region 76d. As such, for stack region 76d, the layers of purge tower 24 have an interlaced pattern that switches back and forth between the part material and the support material on a layer-by-layer basis.

After the last layer in stack region 76b is completed, and platen gantry 32 lowers platen 30 and platen substrate 44 downward by a single layer increment, the situation changes again because the next layer (i.e., the first layer in stack region 76e) includes only the part material for overhanging top 20c. As such, if support print head 18s is currently the print head 18 in its operating mode, print heads 18 may be switched such that support print head 18s is brought to its stand-by mode and part print head 18p is brought to its operating mode. Part print head 18p undergo a purge operation by printing the next layer of purge tower 24 from the part material.

Alternatively, if part print head 18p is currently the print head 18 in its operating mode, it may remain in its operating mode, and print the next layer of purge tower 24 from the part material to maintain the height of purge tower 24. Part print head 18p may then print each successive layer of overhanging top in stack region 76e from the part material, where platen gantry 32 may incrementally lower platen 30 and platen substrate 44 downward by a single layer increment between each printed layer.

At this point, because there are no subsequent layers of support structure 22, no additional layers of purge tower 24 are required, as shown. As mentioned above, purge tower 24 can be stopped at the highest layer at which there is a material change (i.e., a switch from part to support material, or vice versa). As such, at stack region 76e, purge tower only requires a single part material layer if part print head 18p was required to be switched to its operating mode for a purge operation. Otherwise, subsequent layers of purge tower 24 may be omitted to reduce material consumption and printing time.

As discussed above, 3D part 20 is preferably printed on one or more layers of support structure 22 (i.e., anchor portion 22a) to anchor 3D part 20 to build substrate 44. This can assist in reducing curl in 3D part 20 during the printing operation. However, alternative printing instructions may produce a situation where the first layer to be printed on build substrate 44 includes tool paths for the 3D part (i.e., part material) and tool paths for the support structure (i.e., support material). In this case, two purge operations will be required for printing the first layer.

Figure 8:
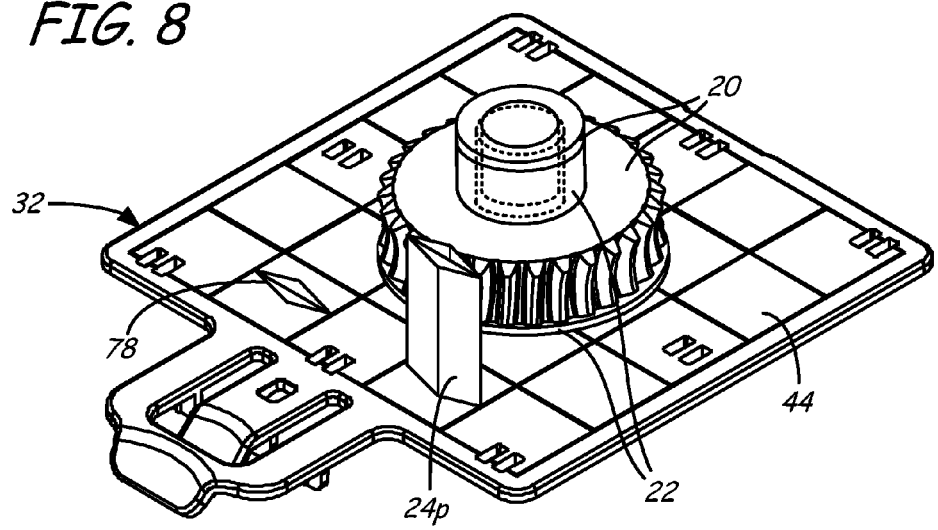
FIG. 8 is a perspective view of a printed 3D part, support structure, purge tower, and a separate purge layer on a build substrate, which illustrates a first alternative purge tower embodiment.

However, because purge tower 24 needs to grow at the same layer rate as the 3D part/support structure, both purge operations cannot be stacked at purge tower 24. Instead, as shown in FIG. 8, one of the purge operations will require a second tool path location (as a single layer 78) laterally adjacent to the first layer of purge tower 24. The remaining purge operations may then be printed on top of the first layer of purge tower 24.

Figure 9:
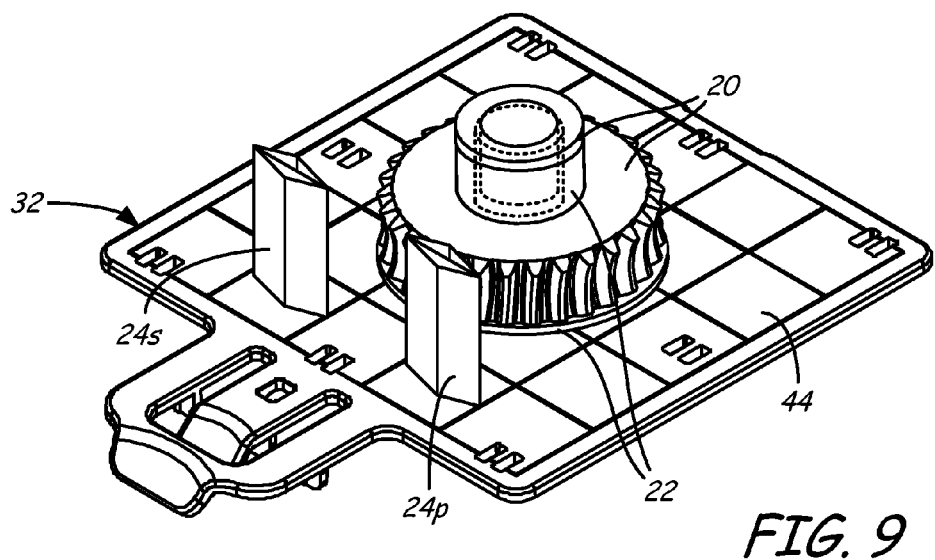
FIG. 9 is a perspective view of a printed 3D part, support structure, and multiple purge towers on a build substrate, which illustrates a second alternative purge tower embodiment.

Alternatively, as shown in FIG. 9, two or more grown purge towers (referred to purge towers 24p and 24s) may be used. In this embodiment, purge tower 24p may be printed entirely from the part material, and purge tower 24s may be printed entirely from the support material. As such, for each layer of 3D part 20 and/or support structure 22, a layer of part material is printed for purge tower 24p and a layer of support material is printed for purge tower 24s. As can be appreciated, this embodiment is less preferred to that shown above with the integrated part/support material purge tower 24, but may function as a usable alternative for performing purge operations.

Figure 10:
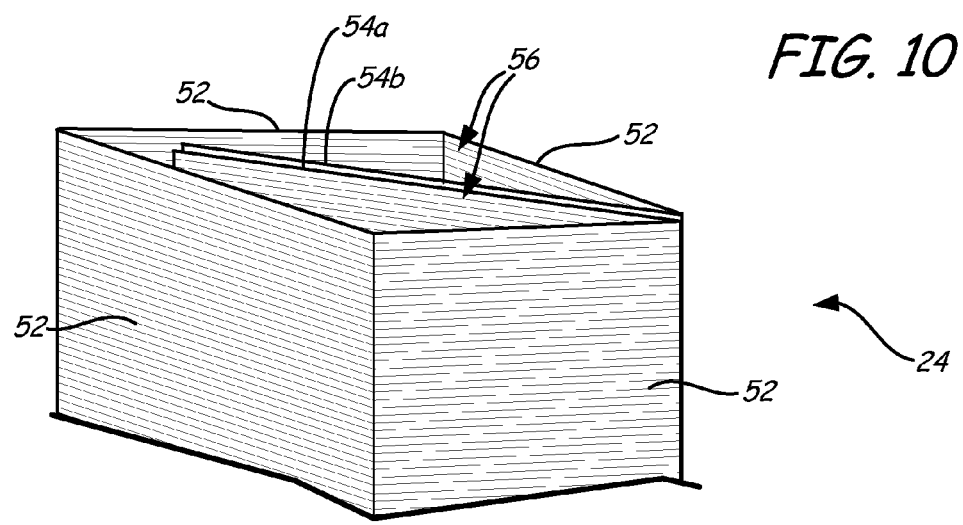
FIG. 10 is a perspective view of a top portion of a first alternative purge tower.
Figure 11:
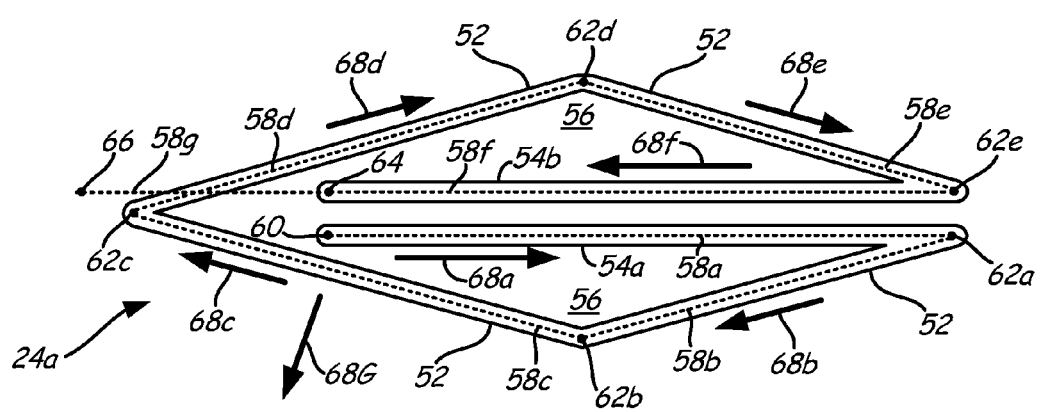
FIG. 11 is a top view of a layer of the first alternative purge tower, illustrating a process for printing the layer.

FIGS. 10 and 11 illustrate an alternative embodiment for purge tower 24, which includes a pair of interior walls 54a and 54b in lieu of a single interior wall 54. As shown in FIG. 11, each layer of this embodiment purge tower 24 may be printed with tool path 58, starting at start vertex 60, and printing a road of part or support material that follows tool path segments 58a-58f and around corner vertices 62a-62e, until stop vertex 64 is reached. As such, in this embodiment, both the start vertex 60 and the stop vertex 64 are located within interior volume 56.

This is beneficial for containing any excess stringing that may occur after the extrusion is stopped to the region within interior volume 56, along with any excess stringing that may occur at the start point, as discussed above. In this embodiment, stop vertex 64 may also optionally function as another corner vertex, and tool path 58 may be directed across the top of layer 24a, as illustrated by tool path segment 58g to a subsequent stop vertex 66 located outside of purge tower 24 to wipe nozzle 18e of the print head 18 to wipe along perimeter wall 52 at tool path segment 58d (or any other suitable location along perimeter wall 52). As such, in this embodiment, purge tower 24 may also function as a tip wipe device, which further precludes the need for a separate purge station.

In some embodiments, system 10 may be operated in a continuous-build manner utilizing scaffolds, such as disclosed in Crump et al., U.S. patent application Ser. No. 13/587,009; Swanson et al., U.S. patent application Ser. No. 13/587,012; and Mannella, U.S. patent application Ser. No. 13/587,015. In these embodiments, separate purge towers 24 may be used with each subsequent 3D part, and may be formed on starter wedges along with each subsequent 3D part.

Accordingly, the method of the present disclosure for performing purge operations by printing one or more purge towers (e.g., purge towers 24 and 74) is beneficial for achieving the above-discussed desired functions of a purge operation without requiring the use of separate purge stations. Additionally, because the purge towers (e.g., purge towers 24 and 74) are generated as 3D parts/support structures, they may be implemented entirely by software/firmware changes to controller 46 and/or computer 50 rather than with hardware changes. As such, the above-discussed method may be readily retrofitted into existing additive manufacturing systems for immediate use. This is particularly useful for establishing printing farms of additive manufacturing systems, which may require full automation of the systems to print numerous 3D parts over extended durations (e.g., over days, weeks, or months).

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
   printing layers of the three-dimensional part and of a support structure for the three-dimensional part from multiple print heads or deposition lines using a layer-based, additive manufacturing technique;
   switching the print heads or deposition line between stand-by modes and operating modes in-between the printing of the layers of the three-dimensional part and the support structure;
   performing a purge operation for each print head or deposition line switched to the operating mode, the purge operation comprising printing at least one purge tower in a layer-by-layer manner, wherein the layers of the at least one purge tower are printed from the print head or deposition line switched to the operating mode.

2. The method of claim 1, wherein the multiple print heads or deposition lines comprise a first deposition line and a second deposition line, and wherein switching the deposition lines between the stand-by modes and the operating modes comprises:
   switching the first deposition line from the stand-by mode to the operating mode; and
   switching the second deposition line from the operating mode to the stand-by mode.

3. The method of claim 1, wherein the multiple print heads or deposition lines comprise a first print head and a second print head, and wherein switching the print heads between the stand-by modes and the operating modes comprises:
   switching the first print head from the stand-by mode to the operating mode; and
   switching the second print head from the operating mode to the stand-by mode.

4. The method of claim 1, wherein printing the layer of the at least one purge tower comprises:
   printing along a first tool path segment between a start vertex and a first corner vertex;
   printing along one or more additional tool path segments from the first corner vertex to a stop vertex, which at least partially encases the first tool path segment in a build plane.

5. The method of claim 1, wherein the at least one purge tower has a cross-sectional area that reduces in height along an axis that is perpendicular to a build plane.

6. The method of claim 1, wherein the at least one purge tower is stopped at a highest layer at which there is a material change for the printed layers of the three-dimensional part and support structure.

7. The method of claim 1, and further comprising:
   generating tool path instructions for printing the layers of the three-dimensional part and of the support structure; and
   generating tool path instructions for printing the layer of the at least one purge tower.

8. The method of claim 7, wherein the generating of the tool path instructions for printing the layer of the at least one purge tower is performed after printing a portion of the layers of the three-dimensional part, after printing a portion of the layers of the support structure, or both.

9. The method of claim 7, wherein the generating of the tool path instructions for printing the layer of the at least one purge tower is performed prior to printing the layers of the three-dimensional part and of the support structure.

10. A method for printing a three-dimensional part with an additive manufacturing system, the method comprising:
    bringing a first print head or deposition line from a stand-by mode to an operating mode;
    printing a first layer of a purge tower printed in a layer-by-layer manner from a support material using the first print head or deposition line in the operating mode;
    printing a layer of a support structure from the support material using the first print head in the operating mode after printing the first layer of the purge tower;
    bringing a second print head or deposition line from a stand-by mode to an operating mode;
    printing a second layer of the purge tower from a part material using the second print head or deposition line in the operating mode; and
    printing a layer of the three-dimensional part from the part material using the second print head in the operating mode after printing the second layer of the purge tower.

11. The method of claim 10, wherein bringing the first print head or deposition line from the stand-by mode to the operating mode comprises heating a liquefier assembly of the first print head or deposition line.

12. The method of claim 10, and further comprising:
    bringing the first print head or deposition line from the operating mode to the stand-by mode while bringing the second print head or deposition line from the stand-by mode to the operating mode;

bringing the first print head or deposition line back from the stand-by mode to the operating mode;

printing a third layer of a purge tower from the support material using the first print head or deposition line brought back to the operating mode;

printing a layer of the support structure from the support material using the first print head brought back to the operating mode after printing the third layer of the purge tower.

13. The method of claim 10, and further comprising printing additional layers of the purge tower such that the purge tower maintains the same height perpendicular to a build plane the printed layers of the three-dimensional part and support structure.

14. The method of claim 10, wherein printing the first layer and the second layer of the one purge tower each comprises:

printing along a first tool path segment between a start vertex and a first corner vertex;

printing along one or more additional tool path segments from the first corner vertex to a stop vertex, which at least partially encases the first tool path segment in a build plane.

15. The method of claim 14, wherein the one or more additional tool path segments define a diamond-shaped pattern in the build plane.

16. A method for printing a three-dimensional part with an additive manufacturing system, the method comprising: (a) printing a first layer of a support structure from a support material for the three-dimensional part; (b) printing a first layer of a purge tower from a part material; (c) printing a first layer of the three-dimensional part on at least a portion of the first layer of the support structure from the part material after printing the first layer of the purge tower; (d) printing a second layer of the purge tower from the support material; and (e) printing a second layer of the support structure on at least a portion of the first layer of the three-dimensional part from the support material after printing the second layer of the purge tower.

17. The method of claim 16, and further comprising repeating steps (b)-(e) for at least a portion of the three-dimensional part and support structure.

18. The method of claim 17, wherein at least a portion of the layers of the purge tower are interlaced between the part material and the support material on a layer-by-layer basis.

19. The method of claim 16, wherein the purge tower comprises a perimeter wall and an interior wall printed from a single tool path, wherein for each printed layer of the purge tower, the interior wall is printed prior to the printing of the perimeter wall.

20. The method of claim 19, wherein the perimeter wall defines a diamond-shape cross-sectional geometry in a build plane.

* * * * *